US008656227B2

(12) United States Patent
Chen (10) Patent No.: US 8,656,227 B2
(45) Date of Patent: Feb. 18, 2014

(54) ON-LINE CLIENT SERVICE METHOD FOR STORAGE APPARATUS

(75) Inventor: Ren-Wei Chen, New Taipei (TW)

(73) Assignee: Transcend Information, Inc., NeiHu Dist, Taipei (TW)

( * ) Notice: Subject to any disclaimer, the term of this patent is extended or adjusted under 35 U.S.C. 154(b) by 356 days.

(21) Appl. No.: 13/178,513

(22) Filed: Jul. 8, 2011

(65) Prior Publication Data

US 2011/0264947 A1 Oct. 27, 2011

Related U.S. Application Data

(63) Continuation-in-part of application No. 12/403,203, filed on Mar. 12, 2009, now abandoned.

(30) Foreign Application Priority Data

Nov. 13, 2008 (TW) .............................. 97143936 A (51) Int. Cl.
G06F 11/00 (2006.01)
(52) U.S. Cl.
USPC .................................. 714/48; 714/26; 714/42
(58) Field of Classification Search
USPC ......... 714/6.1, 6.31, 26, 42, 48; 717/172, 173
See application file for complete search history.

(56) References Cited

U.S. PATENT DOCUMENTS

| 6,370,455 | B1 | 4/2002 | Larson |
| 6,859,699 | B2 | 2/2005 | Carroll |
| 6,892,216 | B2 | 5/2005 | Coburn |
| 7,136,728 | B2 | 11/2006 | Larson |
| 7,136,768 | B1 * | 11/2006 | Shah et al. .................... 702/115 |
| 7,231,493 | B2 * | 6/2007 | Nguyen et al. ................ 711/114 |
| 7,240,188 | B2 * | 7/2007 | Takata et al. ...................... 713/1 |
| 7,739,007 | B2 | 6/2010 | Logsdon |
| 7,792,920 | B2 | 9/2010 | Istvan |
| 7,818,556 | B2 * | 10/2010 | Iima et al. .......................... 713/1 |
| 8,074,018 | B2 * | 12/2011 | Kawada et al. ................ 711/114 |
| 2002/0073362 | A1 * | 6/2002 | Arnaout et al. .................. 714/42 |
| 2002/0166027 | A1 * | 11/2002 | Shirasawa et al. ............ 711/114 |
| 2004/0260984 | A1 * | 12/2004 | Lee .................................. 714/48 |
| 2005/0160257 | A1 * | 7/2005 | Kruger et al. ..................... 713/2 |
| 2008/0120423 | A1 | 5/2008 | Hall |
| 2009/0106584 | A1 * | 4/2009 | Nakayama et al. ............... 714/6 |
| 2009/0132710 | A1 | 5/2009 | Pelley |

* cited by examiner

*Primary Examiner* — Yolanda L Wilson
(74) *Attorney, Agent, or Firm* — Winston Hsu; Scott Margo (57) ABSTRACT

An on-line client service method for a storage apparatus includes establishing a link between a client host and the storage apparatus for detecting the current status of the storage apparatus, the client host generating a diagnostic result of the storage apparatus, the client host transmitting the diagnostic result to a far-end server, the far-end server determining whether the storage apparatus functions abnormally according to the diagnostic result. If the storage apparatus functions abnormally, the client host reloads a firmware provided by the far-end server to the storage apparatus, and determines whether the storage apparatus functions abnormally after the storage apparatus is reloaded with the firmware.

18 Claims, 6 Drawing Sheets

ON-LINE CLIENT SERVICE METHOD FOR STORAGE APPARATUS

CROSS REFERENCE TO RELATED APPLICATIONS

This application is a continuation-in-part of application Ser. No. 12/403,203, filed Mar. 12, 2009.

BACKGROUND

1. Technical Field

The present invention relates to a repairing method of a storage apparatus. More specifically, the present invention relates to a repairing method of a storage apparatus that proceeds on-line.

2. Description of the Conventional Art

A flash drive is a small, portable, computer peripheral storage device. The flash drive is mostly compliant to the standard universal serial bus (USB) communication interface. The flash drive may also be bridged to a computer platform equipped with a USB connection port, for example, a desktop personal computer, a notebook computer, a personal digital assistant (PDA), etc, to provide a user with a plug-and-play (PnP) type external data storage function. The flash drive has become a popular computer peripheral storage device in the present consumer market of computers as the flash drive is small, light, easy to carry around, and does not require external power supply or driver program installation to the computer platform.

Currently, the flash drive mostly uses a flash memory as its storage device. The flash memory itself includes a plurality of blocks. There are about eight thousand blocks in a 128 Mb flash memory device. Moreover, each of the blocks can be divided into a plurality of pages that generally ranges from 8 to 64 pages. When reading data from the flash memory, first, the location of the block to be read is to be identified, and the page to be read is searched from the target block. In order for the data reading to proceed successfully, a configure data is stored in the flash memory. When the data is written into or reading from the flash memory, the configure data is used to find the target block and page.

In light of the foregoing, when the configure data is damaged, the flash drive can not perform data writing and reading normally. As the configure data concerns the trade secret of each manufacturer, it can not be given to the user randomly. Therefore, in the conventional technique, when the configure data of the flash drive is damaged or lost, the user can not maintain the flash drive by himself/herself, but needs to send the flash drive to the maintenance center for maintenance. These actions are not only time and labor consuming, but the user also worries about whether or not the data stored in the flash drive would be disclosed.

SUMMARY

The present invention discloses an on-line client service method for a storage apparatus. The method comprises establishing a link between a client host and the storage apparatus for detecting the current status of the storage apparatus; generating a diagnostic result of the storage apparatus; transmitting the diagnostic result to a far-end server; determining whether the storage apparatus functions abnormally by the far-end server according to the diagnostic result; reloading a firmware provided by the far-end server to a first memory area of the storage apparatus when the storage apparatus functions abnormally; determining whether the storage apparatus functions abnormally after the firmware is reloaded in the first memory area; and reinitializing a second memory area of the storage apparatus when the storage apparatus functions abnormally after the firmware is reloaded to the storage apparatus.

The present invention further discloses an on-line client service method. The method comprises accepting a storage apparatus by a client host to generate a diagnostic result of the storage apparatus; determining whether the storage apparatus functions abnormally by transmitting the diagnostic result to a far-end server; reloading a firmware provided by the far-end server to the storage apparatus when the storage apparatus functions abnormally, wherein the firmware corresponds to the storage apparatus; and selectively reinitializing the storage apparatus after the firmware is reloaded to the storage apparatus by the client host.

The present invention further comprises an on-line client service method for a storage apparatus. The method comprises establishing a link between a client host and the storage apparatus for detecting the current status of the storage apparatus; generating a diagnostic result of the storage apparatus; transmitting the diagnostic result to a far-end server; determining whether the storage apparatus functions abnormally by the far-end server according to the diagnostic result; reloading a firmware provided by the far-end server to a first memory area of the storage apparatus when the storage apparatus functions abnormally; determining whether the storage apparatus functions abnormally after the firmware is reloaded to the first memory area of the storage apparatus; and reinitializing a second memory area of the storage apparatus when the storage apparatus functions abnormally after the firmware is reloaded.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION

Figure 1:
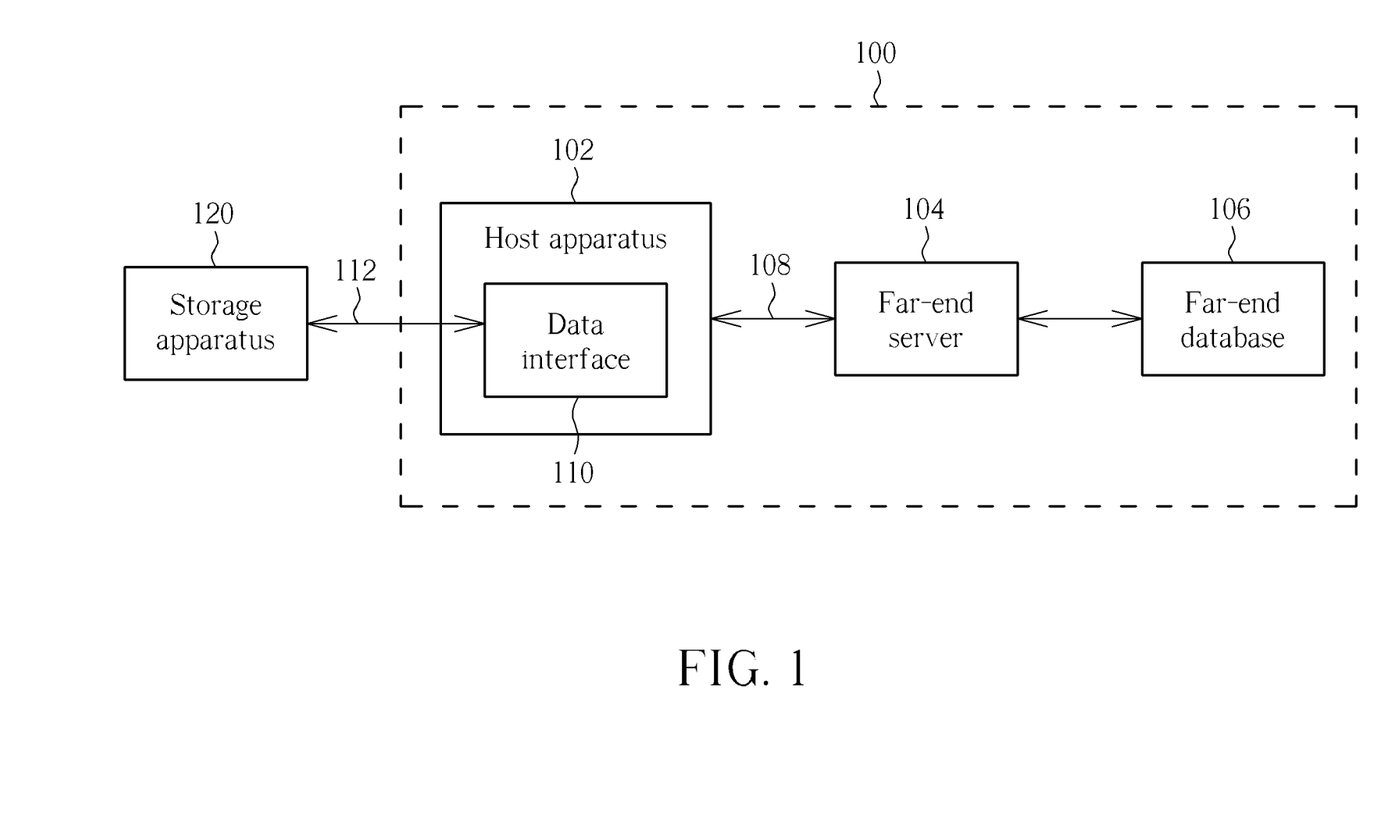
FIG. 1 is a schematic structural diagram of an on-line client service system according to one embodiment of the present invention.

FIG. 1 is a schematic structural diagram of an on-line client service system according to one embodiment of the present invention. Referring to FIG. 1, an on-line client service system 100 provided in the present embodiment is suitable for a portable storage apparatus 120. The storage apparatus 120 may be a flash drive or an audio player, for example, an MP3 player. The on-line client service system 100 includes a client host apparatus 102, a far-end server 104, and a far-end database 106. The host apparatus 102 may be a personal computer or a portable computer. The host apparatus 102 can be coupled to the far-end server 104 through a network 108. Moreover, the far-end server 104 can also be coupled to the far-end database 106.

The host apparatus 102 located on the client side has a data interface 110 and the host apparatus 102 can be coupled to a data transmission interface 112. Thus, the storage apparatus 120 can then be coupled to the host apparatus 102 through the data transmission interface 112. In some embodiments, the data transmission interface 112 may be embodied with the USB.

Figure 2:
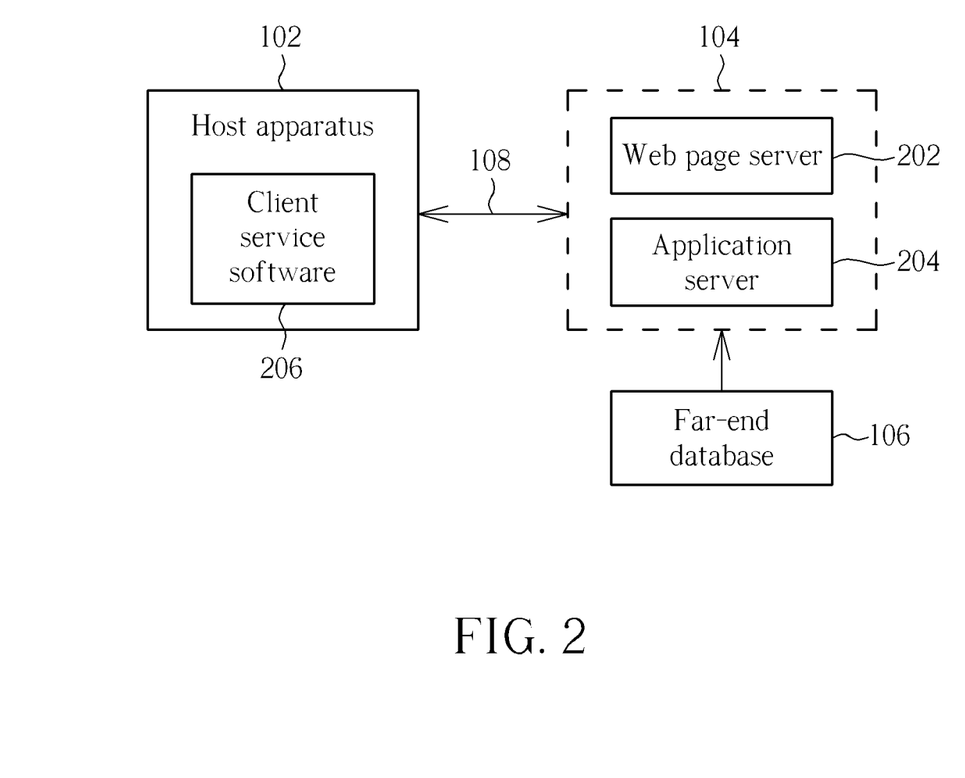
FIG. 2 is a schematic structural diagram of a far-end server system according to one embodiment of the present invention.

FIG. 2 is a schematic structural diagram of a far-end server system according to one embodiment of the present invention. Referring to FIG. 2, the far-end server 104 may include a web page server 202 and an application server 204. When a user transmits information with the host apparatus 102 to the far-end server 104 through the network 108, the web page server 202 can send a web page frame to the host apparatus 102 on the client side through the network 108. So, the current system information is displayed to the user and the user is allowed to input data through this web page frame. In addition, in the present embodiment, the host apparatus 120 may also download and install a client service software 206 from the far-end server (i.e., the application server 204).

Figure 3:
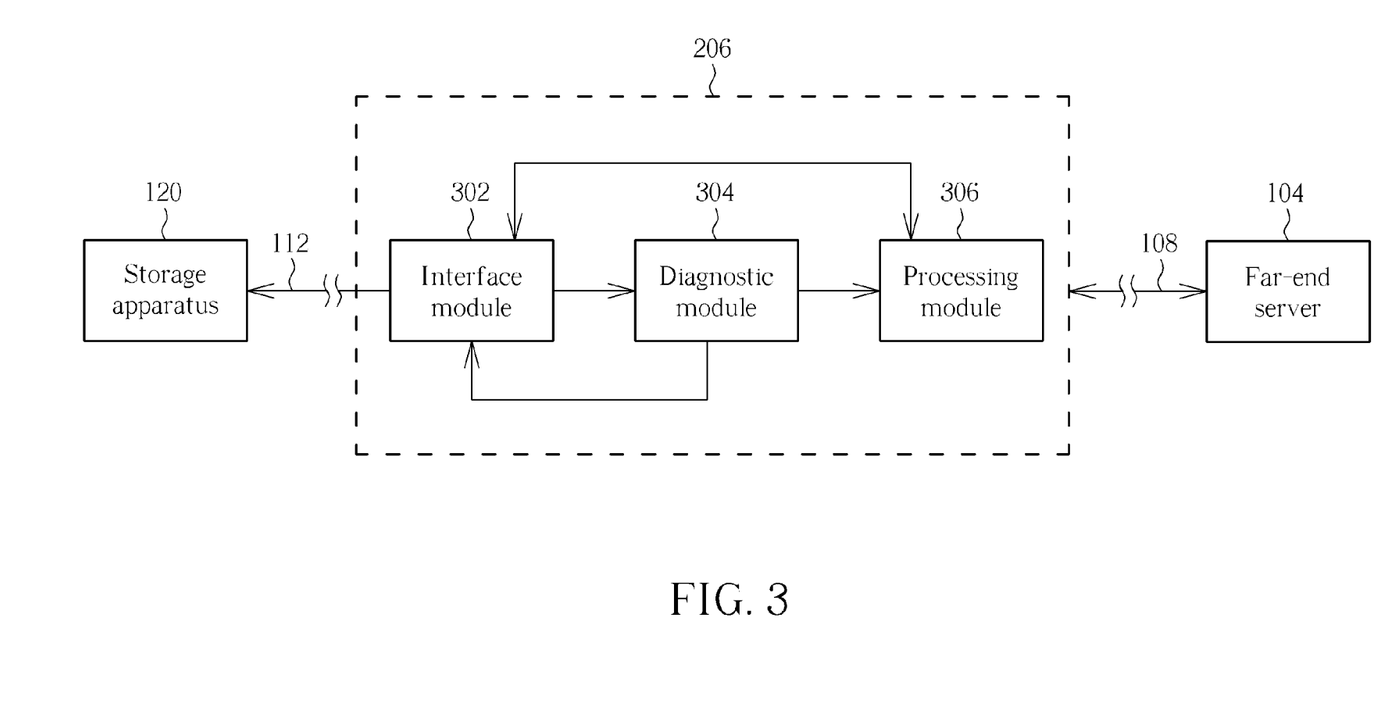
FIG. 3 is a functional block diagram of an on-line client service software product according to one embodiment of the present invention.

FIG. 3 is a functional block diagram of a client service software product according to one embodiment of the present invention. Referring to FIG. 3, the client service software 206 provided in the present embodiment includes an interface module 302, a diagnostic module 304, and a processing module 306. Here, the interface module 302 can be coupled to the diagnostic module 304 and the processing module 306 while the diagnostic module 304 can also be coupled to the processing module 306. Moreover, the processing module 306 may also be coupled to the far-end server through the network 108.

Referring to both FIG. 2 and FIG. 3, when the client service software 206 is downloaded from the far-end server 104 to the host apparatus 120, the diagnostic module 304 can use the interface module 302 to determine whether or not the storage apparatus 120 is coupled to the host apparatus 102 through the data transmission interface 112 indicated in FIG. 1. If the storage apparatus 120 is coupled to the host apparatus 102 through the data transmission interface 112, then the interface module 302 can establish the link with the storage apparatus 120 and demand the far-end server 104 to send a web page or download a client service software through the network 108. The web page or the client service software can provide an operation frame on the display panel of the host apparatus 102. In the present embodiment, the operation frame provided by the interface module 302 can display the current system information to the user, and also display the diagnostic result generated by the diagnostic module. Furthermore, the operation frame may also demand the user to input device identification information regarding the storage apparatus 120, for instance, device identification code, device manufacture serial number, etc. Generally, each of the storage apparatuses is endowed with unique machine identification information during manufacture process in the factory.

When the user inputs the device identification information related to the storage apparatus 120, the client service software 206 can transmit the device identification information to the far-end server 104 through the processing module 306. By doing so, the far-end server 104 can search for data regarding the storage apparatus 120 from the far-end database 106 base on the device identification information.

When the far-end server 106 confirms the related data of the storage apparatus 120, the information can be transmitted back to the client service software 206 through the network 108. When the client service software 206 acquires the device identification information regarding the storage apparatus 120, the processing module 306 can recover, repair, and update the current status of the storage apparatus 120 through the interface module 302.

Figure 4:
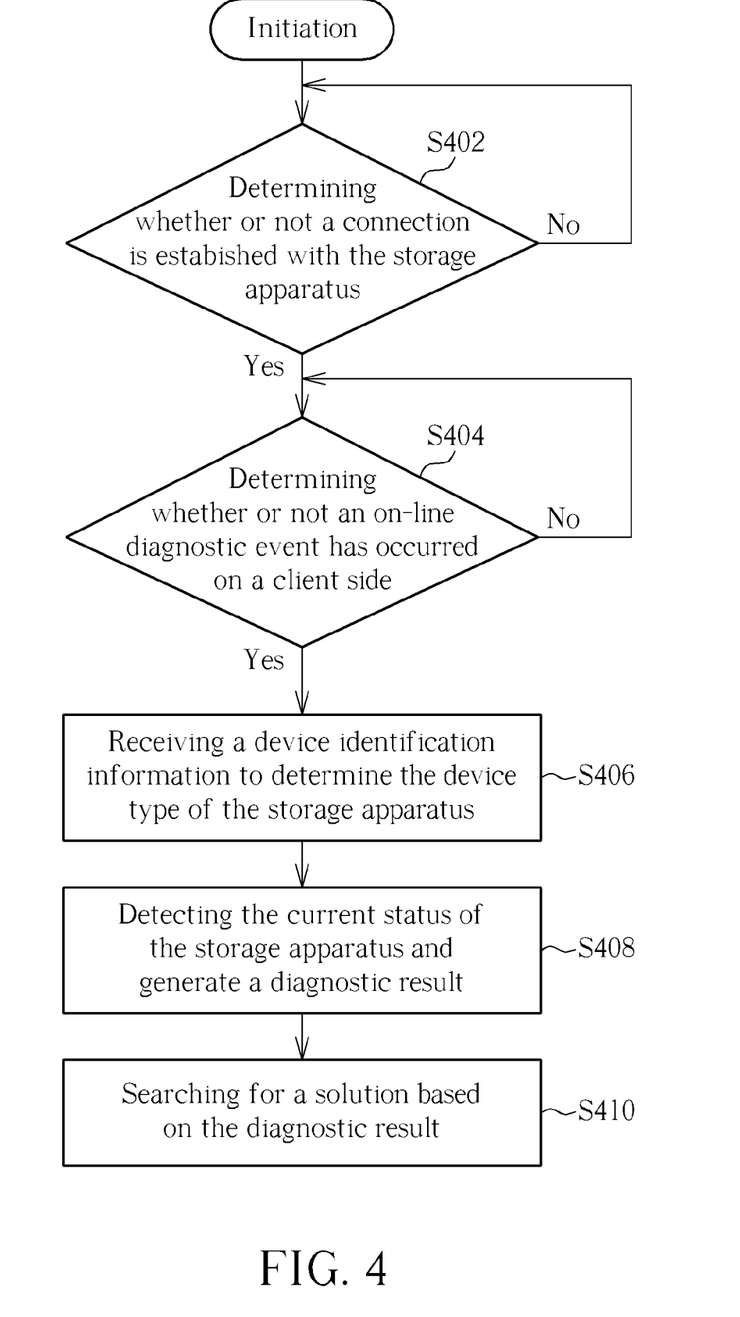
FIG. 4 is a flow diagram of an on-line client service method according to one embodiment of the present invention.

According to the aforementioned description, the present invention also provides a flow diagram of an on-line client service method as shown in FIG. 4. Referring to FIG. 4, in the present embodiment, first, as described in step S402, determine whether or not the link is established with the storage apparatus. When the link is successfully established with the storage apparatus (as indicated by the "Yes" in step S404), then the step S404 can be proceeded, that is, determine whether or not an on-line diagnostic event has occurred on a client side. Herein, the on-line diagnostic event in step S404 may be that, for example, the far-end server 104 is initiated, and the client service software 206 is installed to the host apparatus 102 as indicated in FIG. 2. When the on-line diagnostic event occurs (as indicated by the "Yes" in step S404), the present embodiment may receive device identification information regarding the storage apparatus to determine the device model of the storage apparatus as described in step S406. After the confirmation of the device model of the storage apparatus, the present embodiment can further detect the current status of the storage apparatus and generate a diagnostic result as indicated in step S408. In other words, the diagnostic result can be generated according to the current status and/or the device model of the storage apparatus. At this moment, the solution is searched based on the diagnostic result to perform proper processing of the storage apparatus as indicated in step S410.

Figure 5:
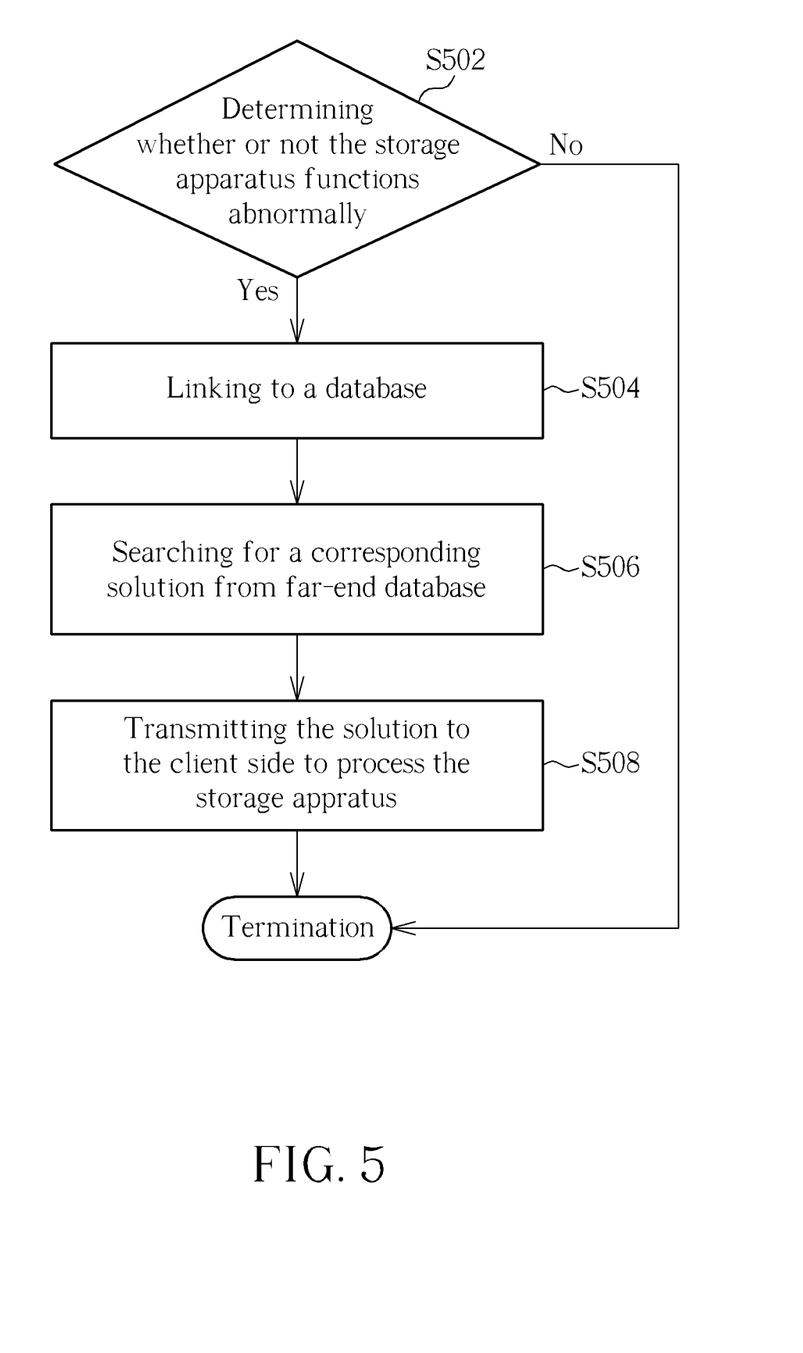
FIG. 5 is a flow diagram of processing the storage apparatus based on a diagnostic result according to one embodiment of the present invention.

FIG. 5 is a flow diagram of the step S410 of FIG. 4 in detail according to one embodiment. Referring to FIG. 5, when receiving the diagnostic result as indicated in FIG. 4, first, determine whether or not the storage apparatus is abnormal based on the diagnostic result as indicated in step S502. If it is determined that no abnormality has occurred in the storage apparatus (as indicated by the "No" in step S502), then the entire process is terminated. On the contrary, if it is determined that abnormality has occurred in the storage apparatus (as indicated by the "Yes" in step S502), then the step S504 can be proceeded. Thus, the storage apparatus is linked to a far-end database to search for a corresponding solution, that is, the step S506. Next, the present embodiment can transmit the solution found to the client side to process the storage apparatus as indicated in step S508.

The specific embodiment of the step S508 in FIG. 5 may be processed differently based on the actual circumstances. In the present invention, several embodiments are provided as follows to illustrate the step S508 specifically. However, it should be known to people skilled in the art that the following embodiments are merely used to illustrate the execution of the step S508, and the embodiment of the present invention is not limited thereto.

First Embodiment:

If the reason for the apparatus to function abnormally is determined to be due to the internal system data (ex., configure data) damage, then, the present embodiment can extract a backup data from a far-end database and rewrite the backup data to the storage apparatus to recover the storage apparatus back to its original status.

Second Embodiment:

If the reason for the apparatus to function abnormally is determined to be due to the internal firmware issue (ex., outdated version, damaged, or lost), then the present embodiment can extract an update data from the far-end database. When the update data is acquired, the update data is then transmitted to the storage apparatus to update the internal firmware.

Although in the above embodiments, the client service software is installed in a client host, it does not limit the present invention. In other embodiments, the client service software may also be installed directly in the storage apparatus. Consequently, when the storage apparatus is coupled to a client host, the user can initiate the client service software installed in the storage apparatus and execute the steps aforementioned.

Figure 6:
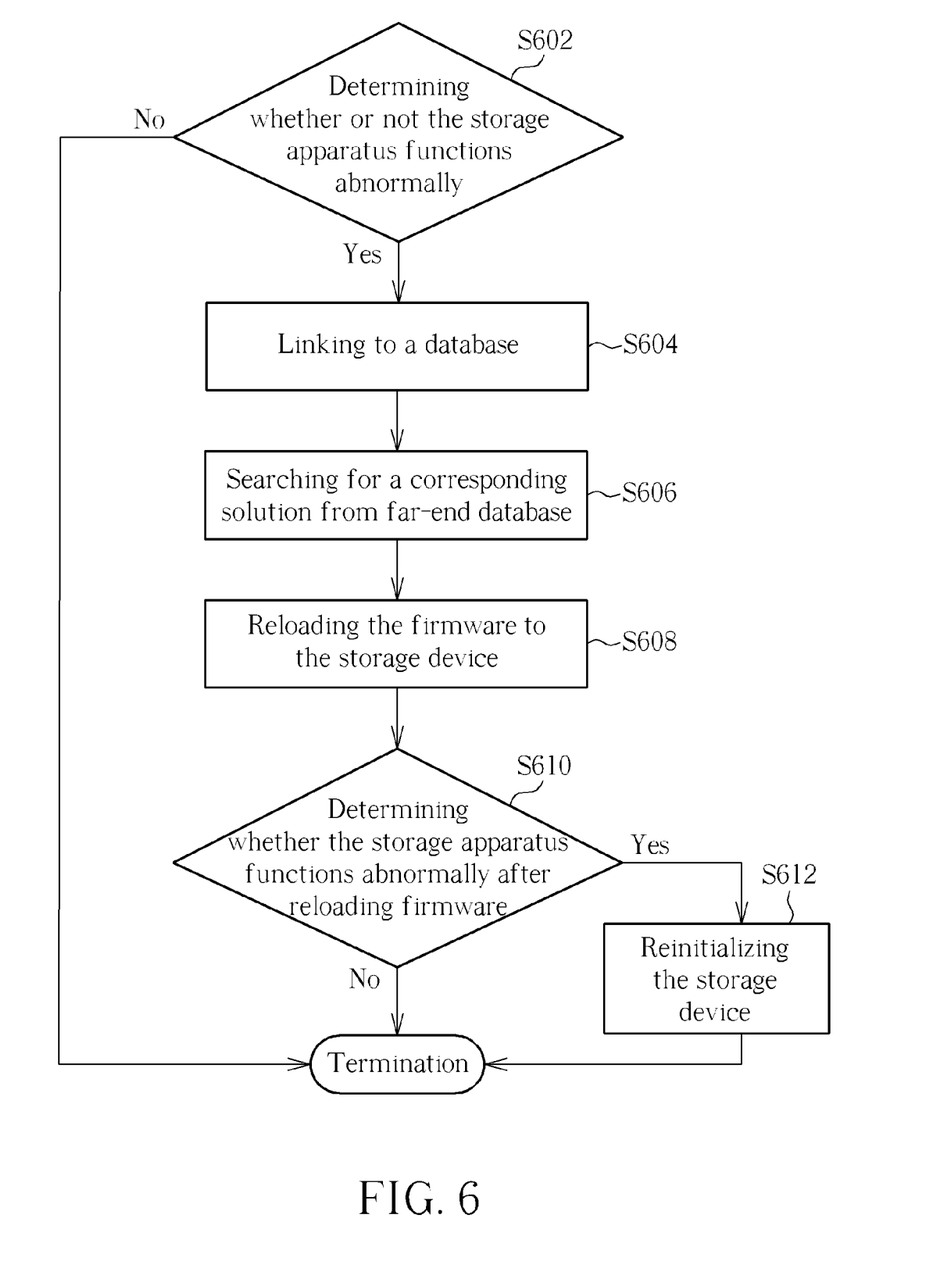
FIG. 6 is a flow diagram illustrating the step S410 in FIG. 4 in detail according to another embodiment of the present invention.

Abnormal functionalities of the storage apparatus 120 can be fixed by, for instance, reloading the firmware of the storage apparatus 120, or reinitializing the storage apparatus 120. Please refer to FIG. 6. FIG. 6 is a flow diagram illustrating the step S410 in FIG. 4 in detail according to another embodiment of the present invention. Operation principles of steps S602, S604 and S606 are similar to those of steps S502, S504 and S506 in FIG. 5. After a link is established between the host apparatus 102 and the storage apparatus 120, the host apparatus 102 detects the current status of the storage apparatus 120 and generates the diagnostic result of the storage apparatus 120 by utilizing the interface module 302 and diagnostic module 304 of the client service software 206. The host apparatus 102 then transmits the diagnostic result to the far-end server 104. The far-end server 104 transmits the diagnostic result to the far-end database 106, for determining whether the storage apparatus 120 functions abnormally according to the diagnostic result.

If the storage apparatus 120 functions abnormally, the host apparatus 102 reloads a firmware to the storage apparatus 120, as shown in step S608 of FIG. 6. The firmware can be provided by the far-end server 104 from the far-end database 106. The firmware may correspond to the storage apparatus 120 according to the device model and relative manufacturing information etc. After the firmware of the storage apparatus 120 is reloaded, the storage apparatus 120 is checked again to see whether the storage apparatus 120 operates abnormally, as shown in step S610 of FIG. 6. For instance, the host apparatus 102 detects the current status of the storage apparatus 120 and generates the diagnostic result again. The host apparatus 102 then transmits the diagnostic result to the far-end database 106 through the far-end server 104, for determining whether the storage apparatus 120 after the firmware is reloaded functions abnormally according to the diagnostic result.

It is possible for the storage apparatus 120 to still function abnormally after the firmware is reloaded, or errors occurred in the storage apparatus 120 are not fully resolved by reloading the firmware. If the storage apparatus 120 still functions abnormally after the firmware is reloaded, the storage apparatus 120 is reinitialized, as shown in step S612 of FIG. 6. Reinitializing the storage apparatus 120 is performed by the host apparatus 120.

The storage apparatus 120, in some instances, may store a data group which is accessible to a user. For instance, the data group can be files stored in the storage apparatus 120 by the user. For most common situations, the firmware loaded on the storage apparatus 120 cannot be modified by the user.

The firmware is usually stored in a different memory area than the data group. For instance, the storage apparatus 120 comprises a first memory area designated for storing the firmware, and a second memory area designated for storing the data group. In one embodiment, different memory area of the storage apparatus 120 indicates different memory sections of the storage apparatus 120. In another embodiment, different memory area of the storage apparatus 120 indicates different physical storage components of the storage apparatus 120. For instance, in the storage apparatus 120 the firmware is stored in read-only memory (ROM) and the data group is stored in flash memory.

Since the firmware and the data group are stored in different memory areas, actions performed to the firmware in the first memory area do not affect the data group in the second memory area, and vice versa. For instance, loading/reloading the firmware to the first memory area of the storage apparatus 120 does not affect the data group stored in the second data group of the storage apparatus 120. The data group remains storing in the second memory area of the storage apparatus 120 after the first memory area of the storage apparatus 120 is reloaded with the firmware in step S608.

Reinitializing, defined for a storage apparatus, sometime especially for a Flash memory apparatus, is similar to "format" or "reset" the storage apparatus, which will help to repair when the memory of the storage apparatus becomes corrupt and will no longer properly store data. Therefore, the data group (i.e. all data) is erased permanently from the storage apparatus 120 after reinitializing the storage apparatus 120 in step S612. Reinitializing the storage apparatus 120 does not affect the firmware in the first memory area of the storage apparatus 120.

Therefore, in steps S608, S610 and S612 of the present embodiment, a 2-step mechanism is provided for ensuring abnormal functionalities of the storage apparatus 120 are resolved. The firmware is firstly reloaded to the storage device 120, and the storage device 120 is checked again for abnormal functionalities. If the storage device 120 still functions abnormally after reloading the firmware, the storage device 120 is reinitialized. This way, abnormal functionalities not fixed by reloading the firmware can be resolved by reinitializing the storage device 120.

In summary, as the present invention can recover, update, or repair the storage apparatus on-line, the present invention has higher convenience. Moreover, due to the method used in the present invention, the user does not need to send the apparatus back to the original manufacturer for the processing. So, the user does not need to worry about data disclosure. On the contrary, to the manufacturer, the user only downloads the data related to the device model when processing the storage apparatus, and does not need to download other software corresponding to unrelated device models.

Although the present invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An on-line client service method for a storage apparatus, comprising:

establishing a link between a client host and the storage apparatus for detecting the current status of the storage apparatus;

generating a diagnostic result of the storage apparatus;

transmitting the diagnostic result to a far-end server;

determining whether the storage apparatus functions abnormally by the far-end server according to the diagnostic result;

reloading a firmware provided by the far-end server to the storage apparatus when the storage apparatus functions abnormally;

determining whether the storage apparatus functions abnormally after the firmware is reloaded; and reinitializing the storage apparatus when the storage apparatus functions abnormally after the firmware is reloaded to the storage apparatus.

2. The on-line client service method of claim 1, wherein the storage apparatus stores a data group, and the data group is erased from the storage apparatus after the storage apparatus is reinitialized.

3. The on-line client service method of claim 2, wherein the firmware is stored in a first memory area of the storage apparatus, and the data group is stored in a second memory area of the storage apparatus.

4. The on-line client service method of claim 2, wherein the firmware is stored in a first storage component of the storage apparatus, and the data group is stored in a second storage component of the storage apparatus.

5. The on-line client service method of claim 1, wherein the storage apparatus stores a data group, and the data group remains storing in the storage apparatus after the storage apparatus is reloaded with the firmware.

6. The on-line client service method of claim 5, wherein the firmware is stored in a first memory area of the storage apparatus, and the data group is stored in a second memory area of the storage apparatus.

7. The on-line client service method of claim 5, wherein the firmware is stored in a first storage component of the storage apparatus, and the data group is stored in a second storage component of the storage apparatus.

8. The on-line client service method of claim 1, wherein when the link is successfully established between the client host and the storage apparatus, receiving a device identification information regarding the storage apparatus from the client host to determine the device model of the storage apparatus, and the firmware corresponds to the storage apparatus according to the device model.

9. The on-line client service method of claim 1, further comprising:

detecting whether the storage apparatus is coupled to the client host through a data transmission interface, for determining whether the link is established between the client host and the storage apparatus.

10. The on-line client service method of claim 1, further comprising:

when the link is established between the client host and the storage apparatus, the client host downloading a client service application software through the network, for diagnosing the storage apparatus and generating the diagnostic result.

11. The on-line client service method of claim 1, wherein the far-end server determining whether the storage apparatus functions abnormally according to the diagnostic result comprises the far-end server transmitting the diagnostic result to a far-end database, for determining whether the storage apparatus functions abnormally.

12. An on-line client service method comprising:

accepting a storage apparatus by a client host to generate a diagnostic result of the storage apparatus;

determining whether the storage apparatus functions abnormally by transmitting the diagnostic result to a far-end server;

reloading a firmware provided by the far-end server to the storage apparatus when the storage apparatus functions abnormally, wherein the firmware corresponds to the storage apparatus;

checking whether the storage apparatus functions abnormally after the firmware is reloaded to the storage apparatus; and reinitializing the storage apparatus when the storage apparatus functions abnormally after the firmware is reloaded to the storage apparatus by the client host.

13. The on-line client service method according to claim 12, wherein the step of accepting the storage apparatus by the client host, the diagnostic result is generated by a client service application software downloaded through a network to the client host.

14. An on-line client service method for a storage apparatus, comprising:

establishing a link between a client host and the storage apparatus for detecting the current status of the storage apparatus;

generating a diagnostic result of the storage apparatus;

transmitting the diagnostic result to a far-end server;

determining whether the storage apparatus functions abnormally by the far-end server according to the diagnostic result;

reloading a firmware provided by the far-end server to a first memory area of the storage apparatus when the storage apparatus functions abnormally;

determining whether the storage apparatus functions abnormally after the firmware is reloaded to the first memory area of the storage apparatus; and reinitializing a second memory area of the storage apparatus when the storage apparatus functions abnormally after the firmware is reloaded.

15. The on-line client service method of claim 14, wherein the second memory area of the storage apparatus stores a data group, the data group is erased when the storage apparatus is reinitialized.

16. The on-line client service method of claim 15, wherein the data group remains storing in the second memory area of the storage apparatus after the first memory area of the storage apparatus is reloaded with the firmware.

17. The on-line client service method of claim 14, wherein the first memory area and the second memory area are different memory sections of the storage apparatus.

18. The on-line client service method of claim 14, wherein the first memory area and the second memory area are different physical storage components of the storage apparatus.

* * * * *